(12) United States Patent
Yadalam et al.

(10) Patent No.: US 12,299,486 B2
(45) Date of Patent: May 13, 2025

(54) INTELLIGENT AUTOSTOPPING OF RESOURCES IN COMPUTING ENVIRONMENTS

(71) Applicant: Harness Inc., San Francisco, CA (US)

(72) Inventors: Ravitej Yadalam, Bengaluru (IN); Navaneeth KN, Bengaluru (IN)

(73) Assignee: Harness Inc., San Francisco, CA (US)

( * ) Notice: Subject to any disclaimer, the term of this patent is extended or adjusted under 35 U.S.C. 154(b) by 536 days.

(21) Appl. No.: 17/838,232

(22) Filed: Jun. 12, 2022

(65) Prior Publication Data

US 2023/0401095 A1    Dec. 14, 2023

(51) Int. Cl.
*G06F 9/50* (2006.01)
*G06F 9/38* (2018.01)
*G06F 9/52* (2006.01)

(52) U.S. Cl.
CPC .......... *G06F 9/5011* (2013.01); *G06F 9/3838* (2013.01); *G06F 9/52* (2013.01)

(58) Field of Classification Search
CPC ......... G06F 9/5011; G06F 9/3838; G06F 9/52
See application file for complete search history.

(56) References Cited

U.S. PATENT DOCUMENTS

| | | | |
|---|---|---|---|
| 9,979,674 B1* | 5/2018 | Kumar | H04L 67/1008 |
| 10,268,493 B2* | 4/2019 | Thomas | G06F 9/5044 |
| 2004/0128310 A1* | 7/2004 | Zmudzinski | H04W 52/0235 707/999.102 |
| 2017/0279927 A1* | 9/2017 | Ramareddy | H04L 43/10 |

* cited by examiner

*Primary Examiner* — Wissam Rashid
(74) *Attorney, Agent, or Firm* — Bachmann Law Group PC

(57) ABSTRACT

A system that provides intelligent shutdown of a resource when the resource is idle for a set period of time. A set of rules may be configured to determine when to shut down the resource, in what order, how to handle traffic when a resource is shut down, and how to startup resources that have been previously shut down when demand requires it. In addition to setting an idle time at which point to shut down the resource, the type of shutdown may be configured. Dependencies may be configured, which indicate how the resource should be shut down or powered up with respect to other resources. A user interface may be used to configure rules, and a dashboard may be provided to see the current status and cost savings information for a set of resources for a system.

20 Claims, 14 Drawing Sheets

INTELLIGENT AUTOSTOPPING OF RESOURCES IN COMPUTING ENVIRONMENTS

BACKGROUND

As network-based systems have evolved, the implementations of those systems have evolved as well. Most network-based systems utilize resources provided by one or more network computing services, such as Amazon Web Service, Google Cloud Platform, Azure, and other services. Many of these services provide several types of resources, and charge customers based on usage of the resource.

One issue with these cloud computing service providers is that although the resources may not be used at a particular time, a user is still being charged for the resource. This makes resource usage more expensive than it needs to be for these customers. What is needed is an improved system for managing resources within a computing environment.

SUMMARY

The present technology, roughly described, provides for an intelligent shutdown of a resource when the resource is idle by not receiving or processing user traffic. A set of rules may be configured to determine when to shut down the resource, in what order, how to handle traffic when a resource is shut down, and how to startup resources that have been previously shut down when demand requires it. In some instances, the resource may be shut down after a set period of activity. The activity may be uniform throughout the resource's life, may be varied based on user preference, or can be determined based on modeling of resource expected usage based on past usage. In addition to setting an idle time at which point to shut down the resource, the type of shutdown may be configured, such as for example a spot shutdown, on-demand shutdown, or complete shutdown. Dependencies may also be configured, which indicate how the resource should be shut down with respect to other resources and how it should be powered up with respect to other resources. A user interface may be used to configure rules, and a dashboard may be provided to see the current status and cost savings information for a set of resources for a system.

In some instances, the present technology provides a method for automatically stopping resources. The method begins by detecting, by a traffic detection module, that a first resource is idle for a set period of time, wherein during the idle time the first resource has not received any traffic consisting of a remote machine request or processed any request received form a remote machine. An application is instructed to redirect subsequent traffic intended for the first resource to a proxy machine, the redirection implemented based at least on a rule set and the detection that the first resource was idle for the set period of time. A shutdown of the first resource is performed based on the rule set. Subsequent traffic is then received by the proxy machine that was intended for the first resource. Start-up of the first resource is performed based on the rule set. Traffic is directed to the first resource by the proxy machine in response when first resource start-up is complete.

In some instances, a non-transitory computer readable storage medium includes embodied thereon a program, the program being executable by a processor to perform a method for automatically stopping resources. The method begins by detecting, by a traffic detection module, that a first resource is idle for a set period of time, wherein during the idle time the first resource has not received any traffic consisting of a remote machine request or processed any request received form a remote machine. An application is instructed to redirect subsequent traffic intended for the first resource to a proxy machine, the redirection implemented based at least on a rule set and the detection that the first resource was idle for the set period of time. A shutdown of the first resource is performed based on the rule set. Subsequent traffic is then received by the proxy machine that was intended for the first resource. Start-up of the first resource is performed based on the rule set. Traffic is directed to the first resource by the proxy machine in response when first resource start-up is complete.

In some instances, a system for automatically stopping resources includes a server having a memory and a processor. One or more modules can be stored in the memory and executed by the processor to detect, by a traffic detection module, that a first resource is idle for a set period of time, wherein during the idle time the first resource has not received any traffic consisting of a remote machine request or processed any request received form a remote machine, instruct an application to redirect subsequent traffic intended for the first resource to a proxy machine, the redirection implemented based at least on a rule set and the detection that the first resource was idle for the set period of time, perform a shutdown of the first resource based on the rule set, receive subsequent traffic by the proxy machine that was intended for the first resource, perform start-up of the first resource based on the rule set, and direct traffic to the first resource by the proxy machine in response when first resource start-up is complete.

DETAILED DESCRIPTION

The present technology, in some instances, provides for an intelligent shutdown of a resource when the resource is idle by not receiving or processing user traffic. A set of rules may be configured to determine when to shut down the resource, in what order, how to handle traffic when a resource is shut down, and how to startup resources that have been previously shut down when demand requires it. In some instances, the resource may be shut down after a set period of activity. The activity may be uniform throughout the resource's life, may be varied based on user preference, or can be determined based on modeling of resource expected usage based on past usage. In addition to setting an idle time at which point to shut down the resource, the type of shutdown may be configured, such as for example a spot shutdown, on-demand shutdown, or complete shutdown. Dependencies may also be configured, which indicate how the resource should be shut down with respect to other resources and how it should be powered up with respect to other resources. A user interface may be used to configure rules, and a dashboard may be provided to see the current status and cost savings information for a set of resources for a system.

Figure 1:
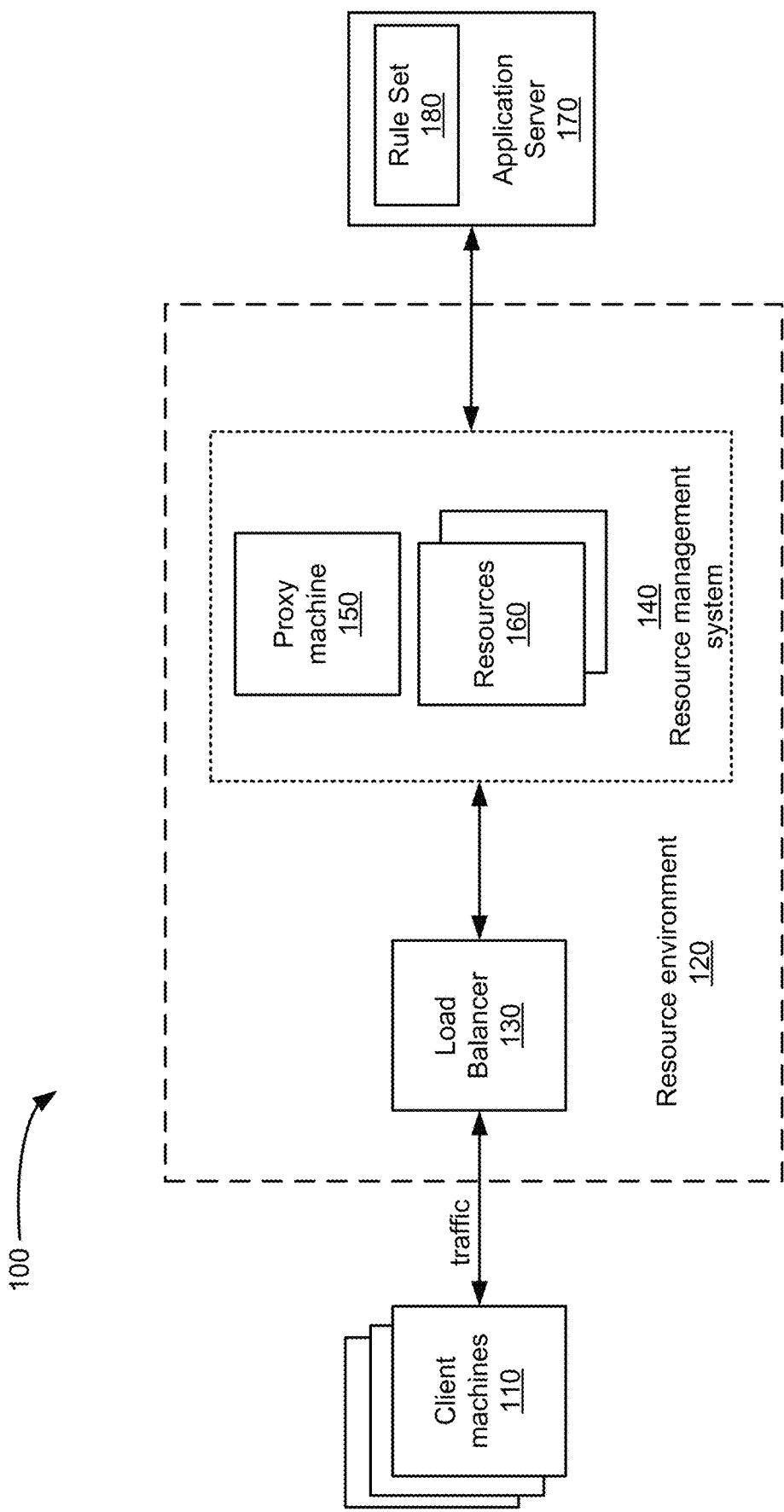
FIG. 1 is a block diagram of a system for providing intelligent shutdown of a resource.

FIG. 1 is a block diagram of a system for providing intelligent shutdown of a resource. The system of FIG. 1 performs resource shutdown when it's detected that the resource is idle for a pre-selected period of time. The system of FIG. 1 includes client machines 110, resource environment 120, and an application server 170. Resource environment 120 may include load balancer 130, proxy machine 150, and resources 160. Application server 170 may include rule set 180.

Client machines 110 may be associated with one or more users, which send communications which require the use of one or more resources 160. Client machines 110 generate traffic which is received by load balancer 130 within resource environment 120. The bouncer 130 may be part of an environment created by a customer which provides resources 160 or may be implemented by a service provider that provides application server 170. Load balancer 130 receives the traffic from client machines 110 and distributes the traffic as needed to one or more resources 160 in an even manner, such that no resources become overloaded. Resource management system 140 includes proxy machine 150 and resources 160. Generally speaking, traffic from the load balancer 130 is provided to resources 160, and the amount of or quantity of traffic provided by load balancer 132 resources 160 is received by proxy machine 150. The amount of traffic may be provided by load balancer 130 to proxy machine 150, or provided by some other traffic detection mechanism to proxy machine 150.

Proxy machine 150 may access rule set 180, either locally or from application server 170. When resources 160 have been idle for a set period of time, that is not receiving and/or processing traffic, proxy machine 150 may execute a rule set associated with shutting down resources 160. Shutting down resources 160 may include having load balancer 130 transmit subsequent client traffic to proxy machine 150, and shutting down resources 160 either by configuring them in "spot" mode, "on-demand" mode, or some other shutdown state. When the next client traffic is received by load balancer 130 and provided to proxy machine 150, proxy machine 150 may communicate to application server 170 that traffic is received for the shutdown resources. Application server 170 may then start up resources 160, and proxy machine 150 may return a webpage to requesting clients indicating that the requested resources are powering up and will be available momentarily.

Once the resources 160 are powered up and ready to process received traffic, proxy machine 150 may instruct load balancer 132 to direct the client traffic received for the resources to the resources. In some instances, client machines 110 may be implemented on one or more remote machines, such as remote workstations, remote computers, remote servers, and so forth. Resource environment 120 may be provided on one or more physical or logical servers by a service provider. A customer may implement their resources as part of their overall system within the computing environment provider that provides resource environment 120. Application server 170 may be implemented on one or more servers external to the resource environment 120.

A resource 160 may be any of several physical or logical entities that are suitable for use in a network based service. For example, a resource may include a network server that provides a website, a network application server, a microservice, a virtual machine, a proxy server, a data store, and/or other type of physical or logical machine.

Figure 2:
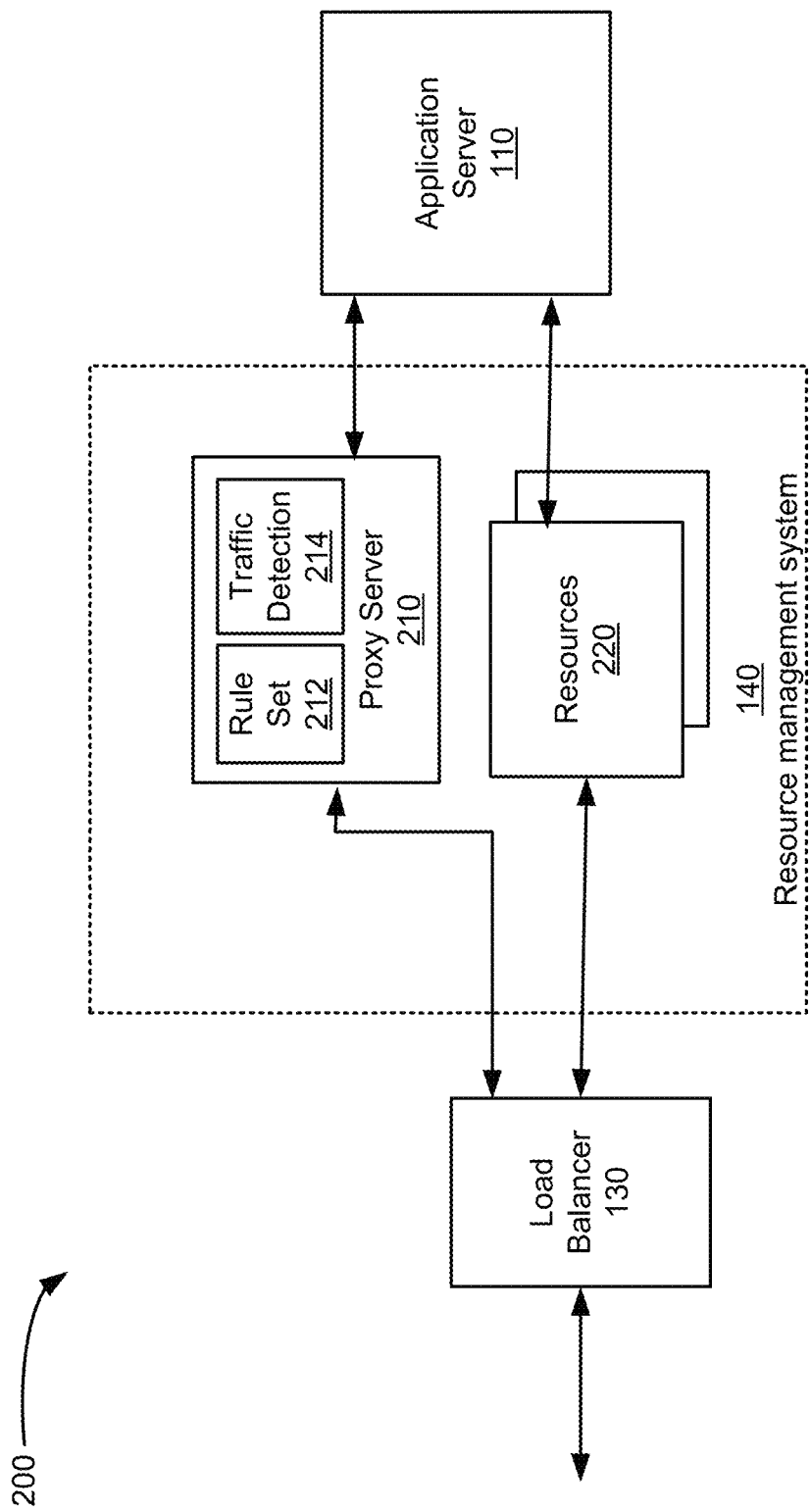
FIG. 2 provides more detail for a resource management system.
Figure 3:
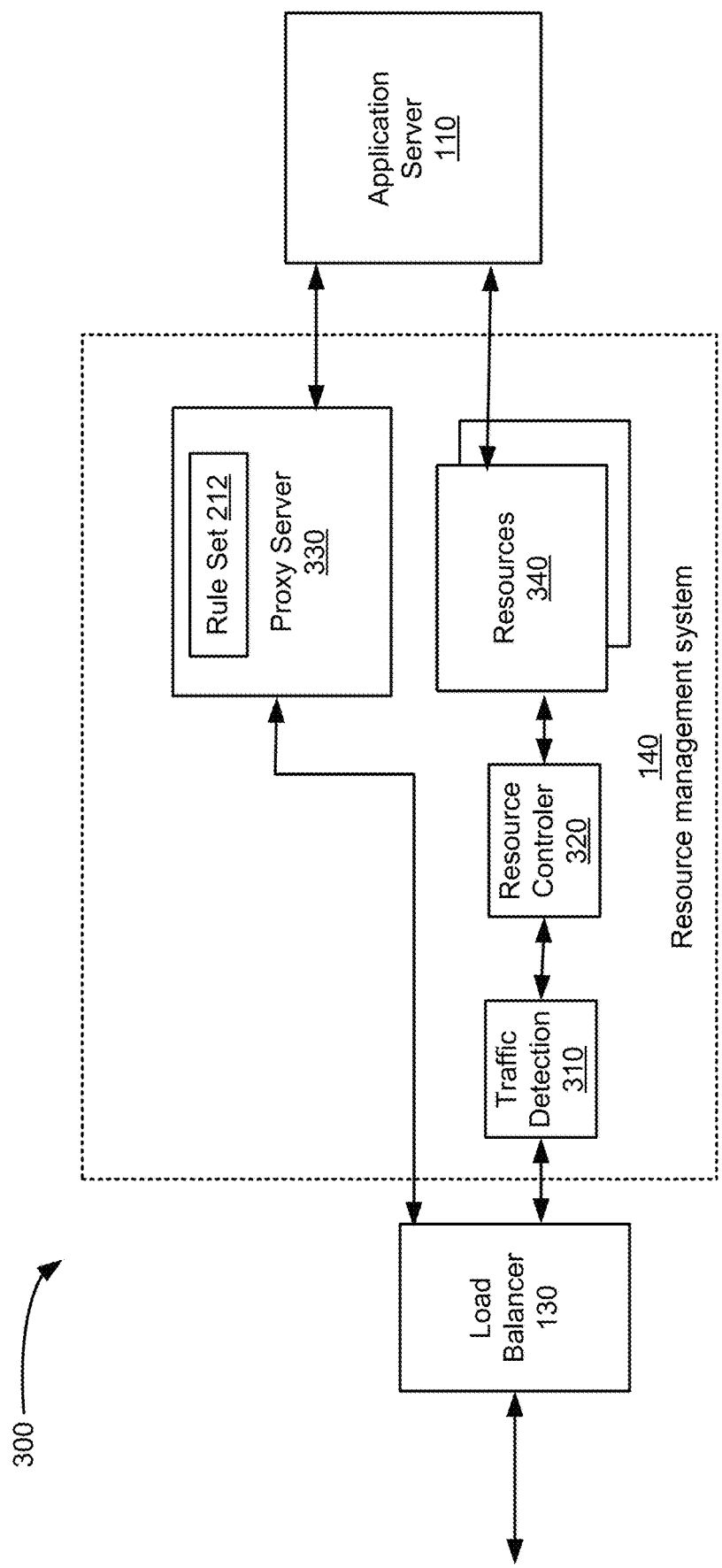
FIG. 3 provides more detail for another resource management system.
Figure 4:
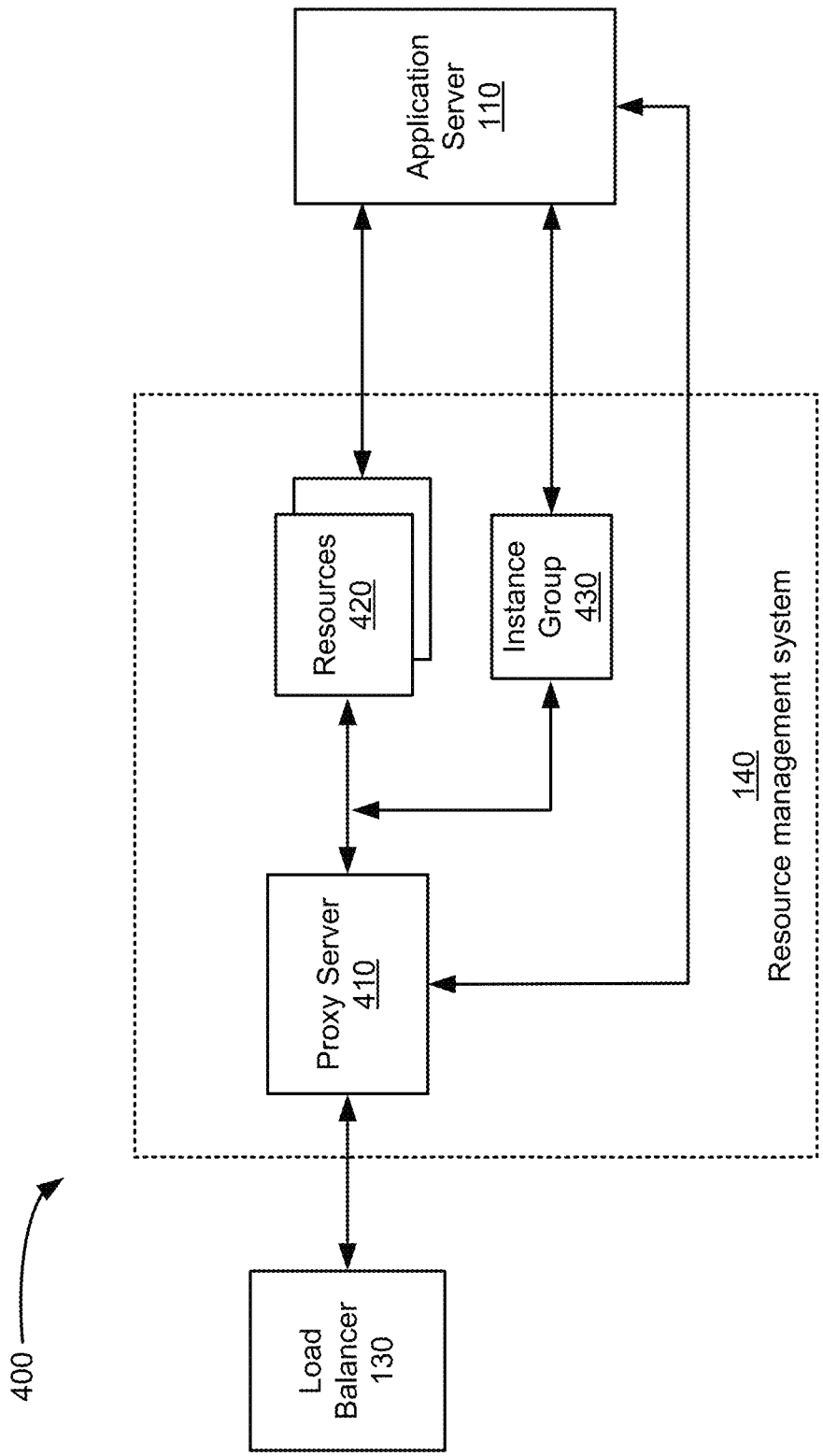
FIG. 4 provides more detail for another resource management system.

Different configurations of computing environments may implement the resource management system 140 in different ways. FIGS. 2-4 implement examples of a resource management system. The illustration of specific implementations in FIGS. 2-4 is not intended to be limiting, but rather to provide options for carrying out the inventive technology described herein.

FIG. 2 provides illustrates a resource management system. Resource management system 200 of FIG. 2 provides more detail of an exemplary implementation of resource management system 140 of FIG. 1. Resource management system 400 of FIG. 2 includes proxy server 210 and resources 220. Proxy server 210 includes rule set 212 and traffic detection 214. In operation, proxy server 210 loads rule set 212 which indicates an idle time at which resources 220 should be shut down. Traffic detection 214 is a module implemented within proxy server 210, or in some instances elsewhere within resource management system 200, that determines the traffic received by resources 220. If traffic detection 214 detects that resources 220 are idle due to no user created traffic, proxy server 210 executes rule set 212 to have load balancer 134 forward user traffic intended for resources 220 to proxy server 210. Resources 220 are then shutdown. While resources 220 are shutdown, proxy server continues to detect traffic that was intended for resources 220.

Upon detecting new traffic for resources 220 that is received by proxy server 210, proxy server 210 executes rule set 212 to startup the resources 220. Proxy server 210 also sends a network page in response all new requests received for resources 220 indicating that resources 220 are being start up and will be providing a response momentarily. Once resources 220 are brought up, proxy server 210 instructs load balancer 130 to forward user requests to the resources themselves.

FIG. 3 provides more detail for another resource management system. Resource management system 300 of FIG. 3 includes traffic detection 310, resource controller 320, proxy server 330, and resources 340. As the user traffic is received by the system, load balancer 130 receives the traffic and forwards it to resource 340. A traffic detection module 310 detects the traffic received by load balancer 130 and passes the traffic through to resources 340. When traffic detection 310 detects no traffic for the resources 340, such that the resource 340 is idle for a particular period of time, traffic detection 310 sends a message to proxy server 330. Proxy server 330 instructs resource controller 320 to shutdown resources 340 and instructs load balancer 130 to forward the traffic intended for resources 340 to proxy server 330. For as long as there is no traffic received for resources 340, resources 340 will be shut down by resource controller 220 in response to a shutdown message provided by proxy server 330 to resource controller 320.

Once load balancer 130 receives new traffic and forwards the new received resources traffic to proxy server 330, proxy server 330 sends a message to resource controller 320 to startup resources 340. In the meantime, proxy server 330 also provides a network page with a message indicating resources 340 are powering up and will be available shortly. Once resources 340 are powered up, proxy server 330 instructs load balancer 130 to redirect user traffic intended for resources 320 back to resources 320.

FIG. 4 provides more detail for another resource management system. Resource management system 400 of FIG. 4 includes proxy server 410, resources 420, and instance group 430. Proxy server 410 may detect the traffic sent by load balancer 130 to resources 420. Proxy server 410 may access a rule set from application server 110 to apply to resources 420 based on traffic received from load balancer 130. Once the proxy server detects that resources 420 have been idle for a configured period of time, proxy server 410 may receive the traffic initially received load balancer. Proxy server 410 may also shutdown resources 420 based on rules received from application server 110 Upon receiving traffic from load balancer 130 intended for resources 420, proxy server 410 may startup resources 420 and provide a network page for the requesting user machines indicating that the resources are powering up and will be available soon. As soon as resources 420 are up and running, proxy server 410 may forward the received resources traffic from load balancer 130 to resources 420.

Figure 5:
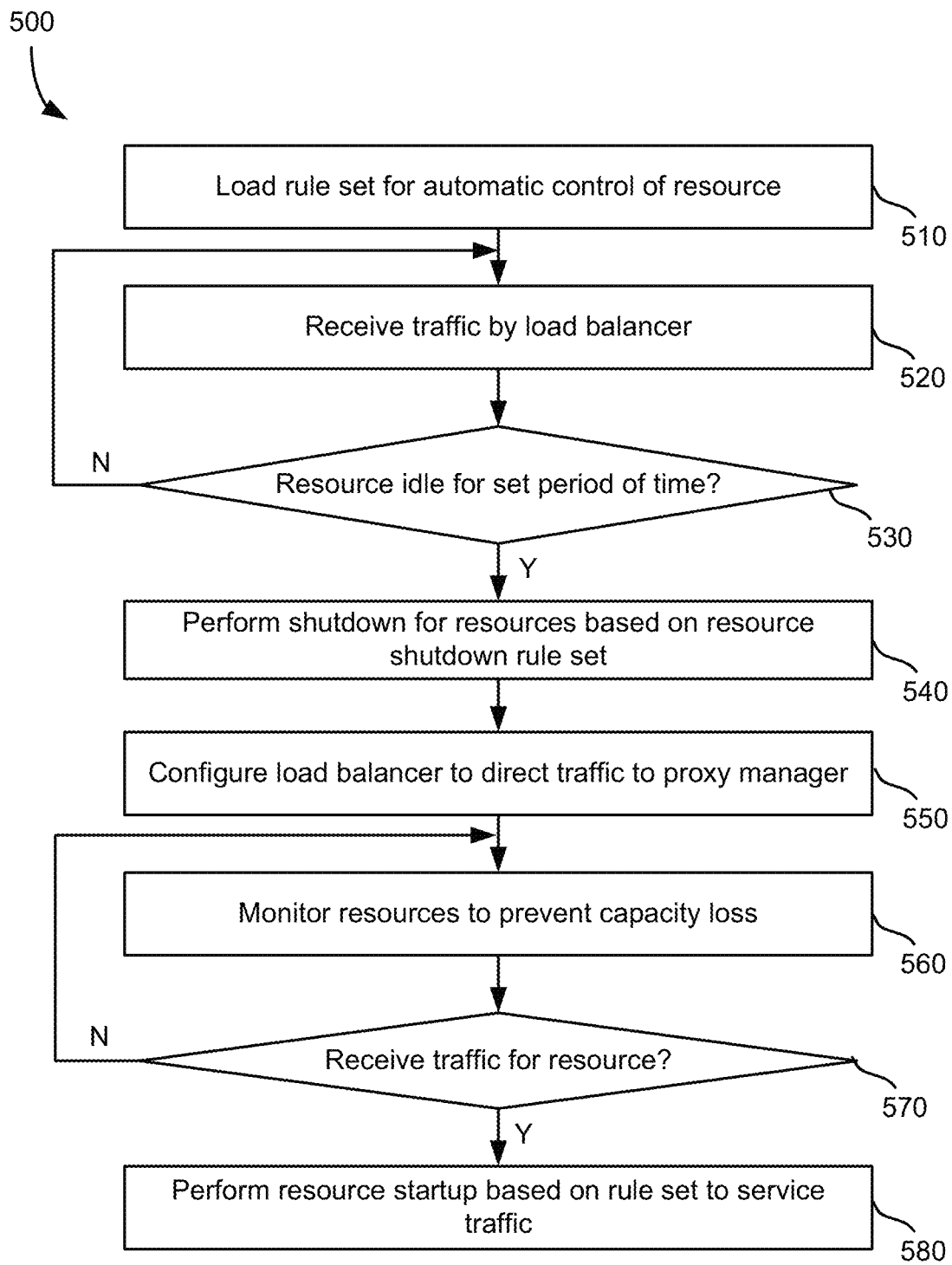
FIG. 5 is a method for providing intelligent shutdown of a resource.

FIG. 5 is a method for providing intelligent shutdown (e.g., autostopping) of a resource. A rule set is loaded for automatic control the resource at step 510. Traffic is then received by a load balancer at step 520. A determination is made as to whether a resource is idle for a set period of time at step 530. The resource may be idle if it receives no traffic and performs no processing of user requests. If the resource is not idle, the method of FIG. 5 returns to step 520.

If the traffic load is idle for a preconfigured set period of time, for example a period of time configured by a user of the system, a shutdown may be performed for the resource based on a resource shutdown rule set at step 540. Shutdown of the resource may include setting the resource to a "spot" status, an "on-demand" status, powering down the resource, or otherwise shutting down the resource such that the computing service provider that provides the resource does not charge usage fees for the resource. In some instances, one or more other resources that have been identified as having a "dependency" with the resource to be shutdown may also be shutdown. The two or more dependent resources may be shutdown in a particular order, for example a data store may be shutdown first, and an application or virtual machine (VM) may be shut down second.

A load balancer may be configured to direct traffic to a proxy manager at step 550. The proxy manager may watch for subsequently received traffic intended for the resources, since the resources have shut down.

Resources may be monitored to prevent capacity loss at step 560. In some computing environments, some resources set to a "spot" status or other status can be removed from a system by the computing environment to fulfill a need in another customer system. The present system has methods for preventing the loss of the resource and corresponding loss in capacity. More details for monitoring the resources to prevent capacity loss is discussed with respect to the method of FIG. 6.

A determination is then made as whether traffic is received for a resource at step 570. If no traffic is received, the method of FIG. 5 may return to step 560. If traffic is received for a particular resource, resource startup is performed based on a startup rule set at step 580. More details for performing resource startup are discussed with respect to the method of FIG. 8.

Figure 6:
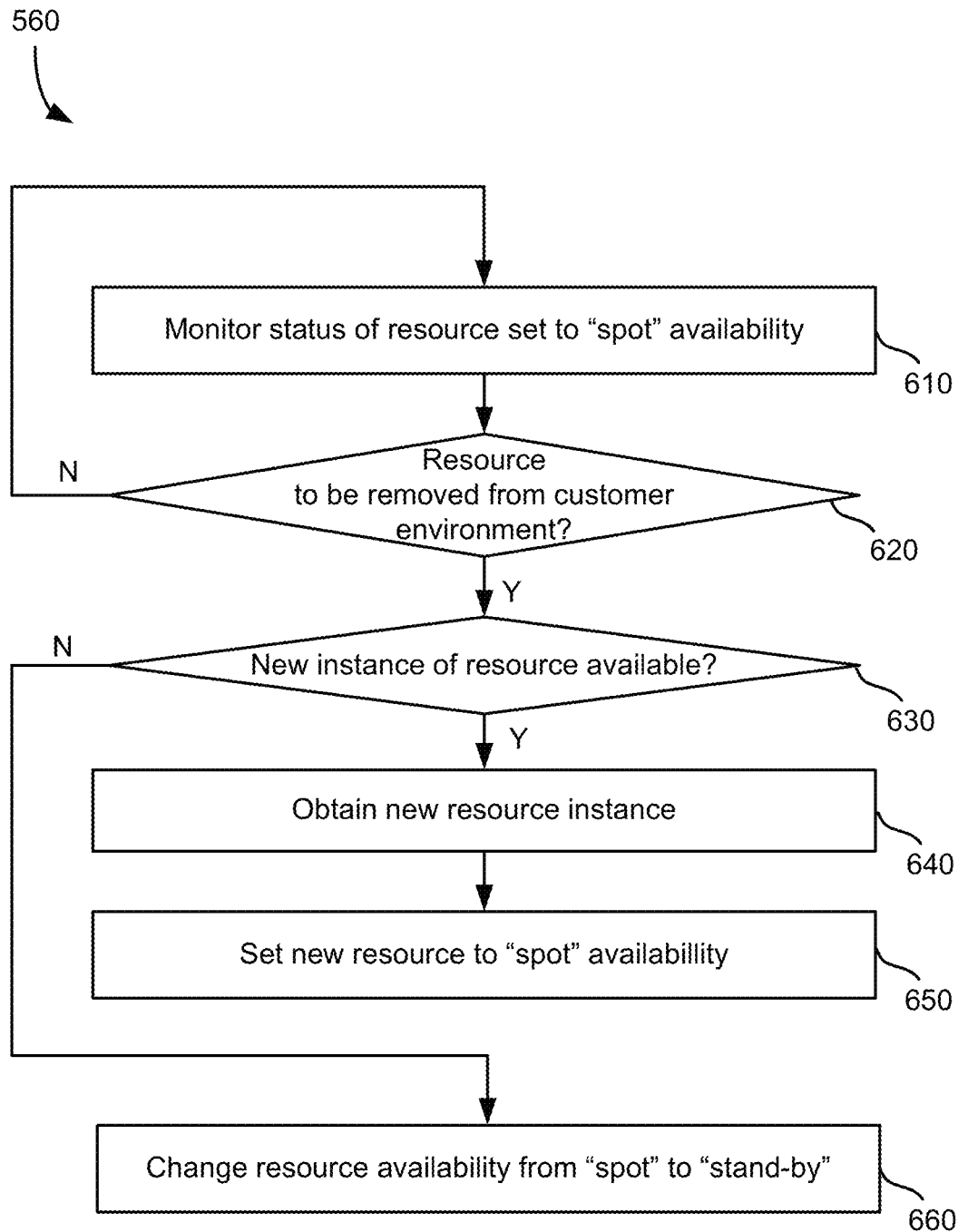
FIG. 6 is a method for monitoring machines to prevent capacity loss.

FIG. 6 is a method for monitoring machines to prevent capacity loss. FIG. 6 provides more detail of step 560 of the method of FIG. 5. The status of a resource set to "spot" availability is monitored at step 610. In some instances, a service provider may revoke or take back a server set to spot availability. Most service providers will provide a notice or alert when a spot resource is a going to be taken away. A determination is made as to whether a resource is to be removed from a customer environment at step 620. An example of a resource removed from a customer environment is a service with spot availability for which notice is received that the computing server provider is removing the resource from the customer's environment. If no notice is received, the method of FIG. 6 returns to step 610. If a resource is to be removed at step 620, a determination is made as whether a new instance of the resource is available at step 630. Rather than becoming short a resource, the system may automatically try and get a new instance of the same resource at step 630. If a new instance of the resource is not available, the resource to be removed can have its availability changed to a "standby" status at step 660. Resources at "standby" status will not be removed by a service provider, although the resource will be more expensive to maintain. If a new instance of the resources available, the new resource instance is obtained at step 640, and the new resources are set to spot availability at step 650.

Figure 7:
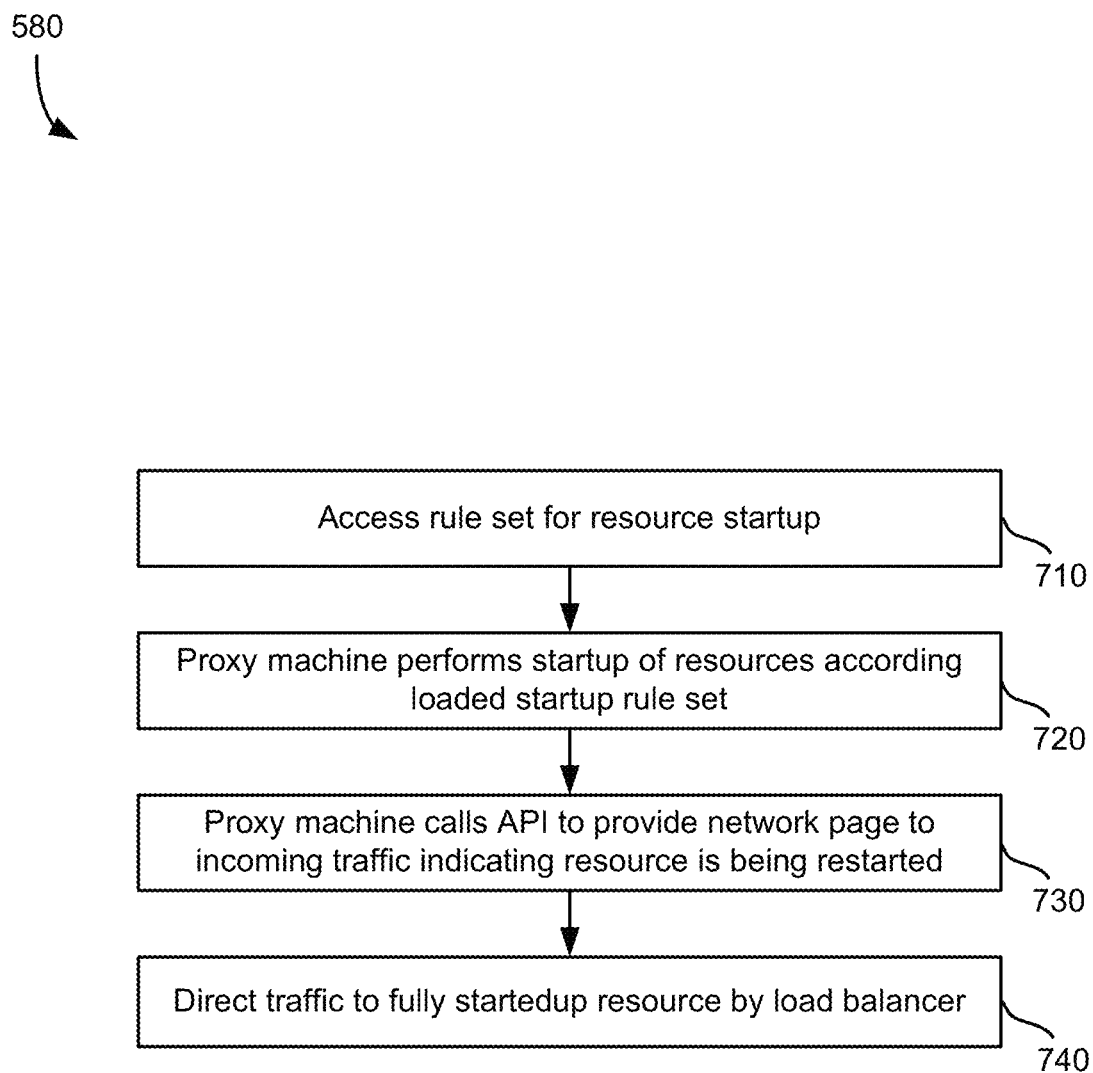
FIG. 7 is a method for performing resource startup based on a rule set to service traffic.

FIG. 7 is a method for performing resource startup based on a rule set to service traffic. The method of FIG. 7 provides more detail for step 580 of the method of FIG. 5. A rule set is accessed for starting up a resource at step 710. In some instance, the rule set may include rules and parameters for starting up multiple resources, such as for example a data store and an application server. A proxy machine restarts one or more resources according to the loaded start-up rule set at step 720. Starting up the one or more resources may include starting up the resources in a particular order, with particular start-up parameters, or configuring the start-up in some other way. For example, a data store may be started up before an application server so that the application server can check the status of the data store immediately upon startup.

The proxy machine calls an API to provide a network page to incoming traffic, indicating that the requested resource is being restarted, at step 730. In some instances, the resource undergoing start-up may take a brief period of time to start up completely. The network page provides a message through a network page to the requesting user's client device that the requested resource is starting up and will be available shortly. Once the requested resources have completed start-up, the proxy server is informed and instructs the load balancer to send the received traffic to the appropriate resource at step 740.

Figure 8:
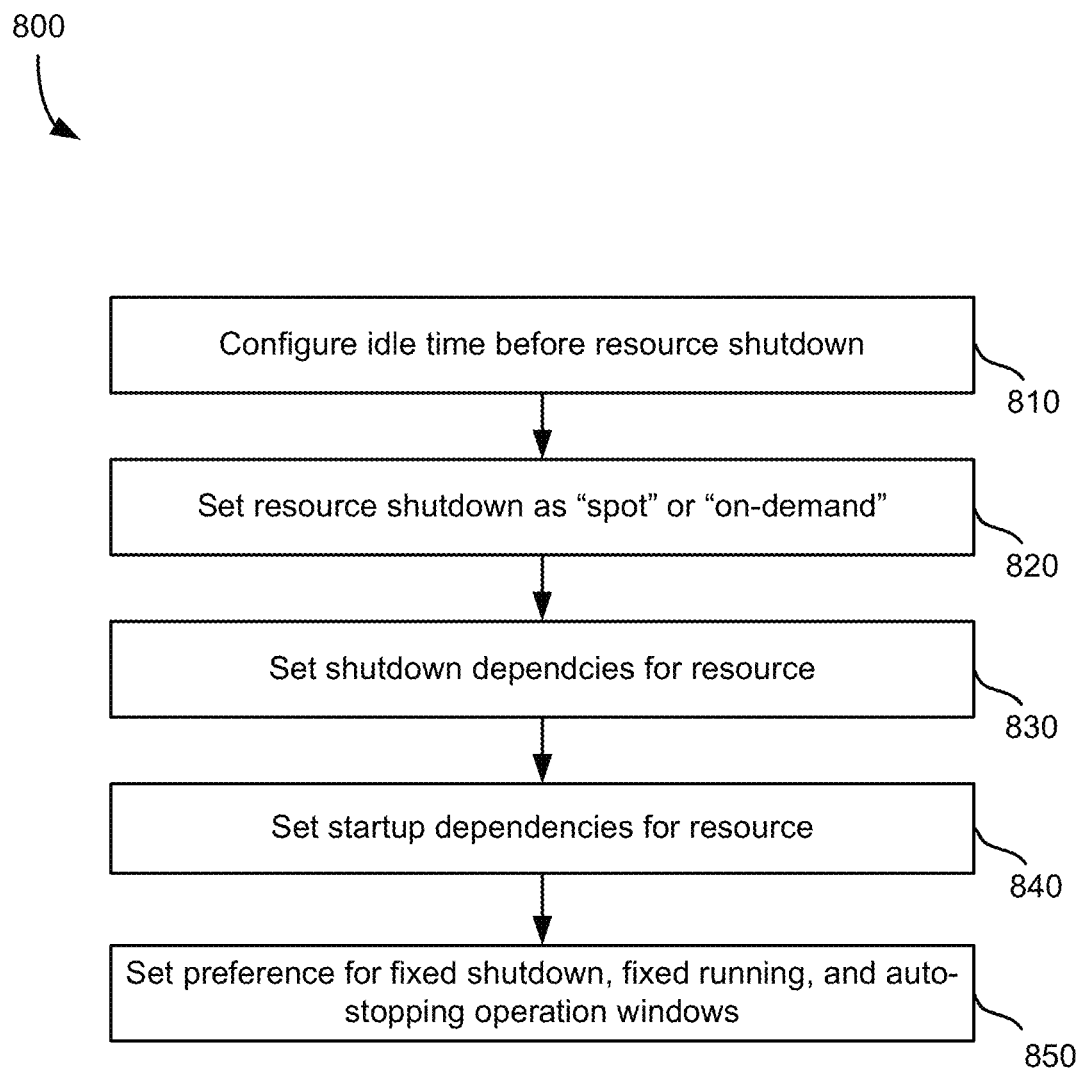
FIG. 8 is a method for configuring rule sets associated with the resource.

FIG. 8 is a method for configuring rule sets associated with the resource. An idle time that should pass before a resource is shut down is configured at step 810. The idle time may be 5 minutes, 10 minutes, or any other period of time. Resource shutdown may be set as "spot," "on-demand," or some other status that can be set in the resource environment at step 820. A "spot" status allows a resource to be powered-down, but the resource may be taken from the user's system by the system provider if needed for another system. A "stand-by" service allows a server to be powered-down and exist in a stand-by mode, without the risk of having the resource taken by the system provider. A "spot" resource is more expensive for a customer to implement in their system than an "on-demand" resource.

Shutdown dependencies of a resource are set at step 830. The shutdown dependencies may indicate an order that one or more resources should be shut-down, for example an application server may need to be shut down before a particular data store. Startup dependencies for a resource are set at step 840. The startup dependencies may indicate an order that one or more resources should be brought up, for example a data store may need to be started up before a particular application server.

Preferences for any fixed shutdown, fixed runtime, and autostopping operation windows are configured at step 850. The preferences may include setting a particular window of time during which one or more resources may stay on regardless of the level of traffic, a particular period of time during which one or more resources may be stay powered down, and a particular period of time during the intelligent auto-stopping discussed herein may be applied to a particular resource.

The method of FIG. 8 may be implemented through a user interface provided by an application server, through a YAML configuration file that is applied to one or more machines in the resource environment, or in some other manner.

Figure 9:
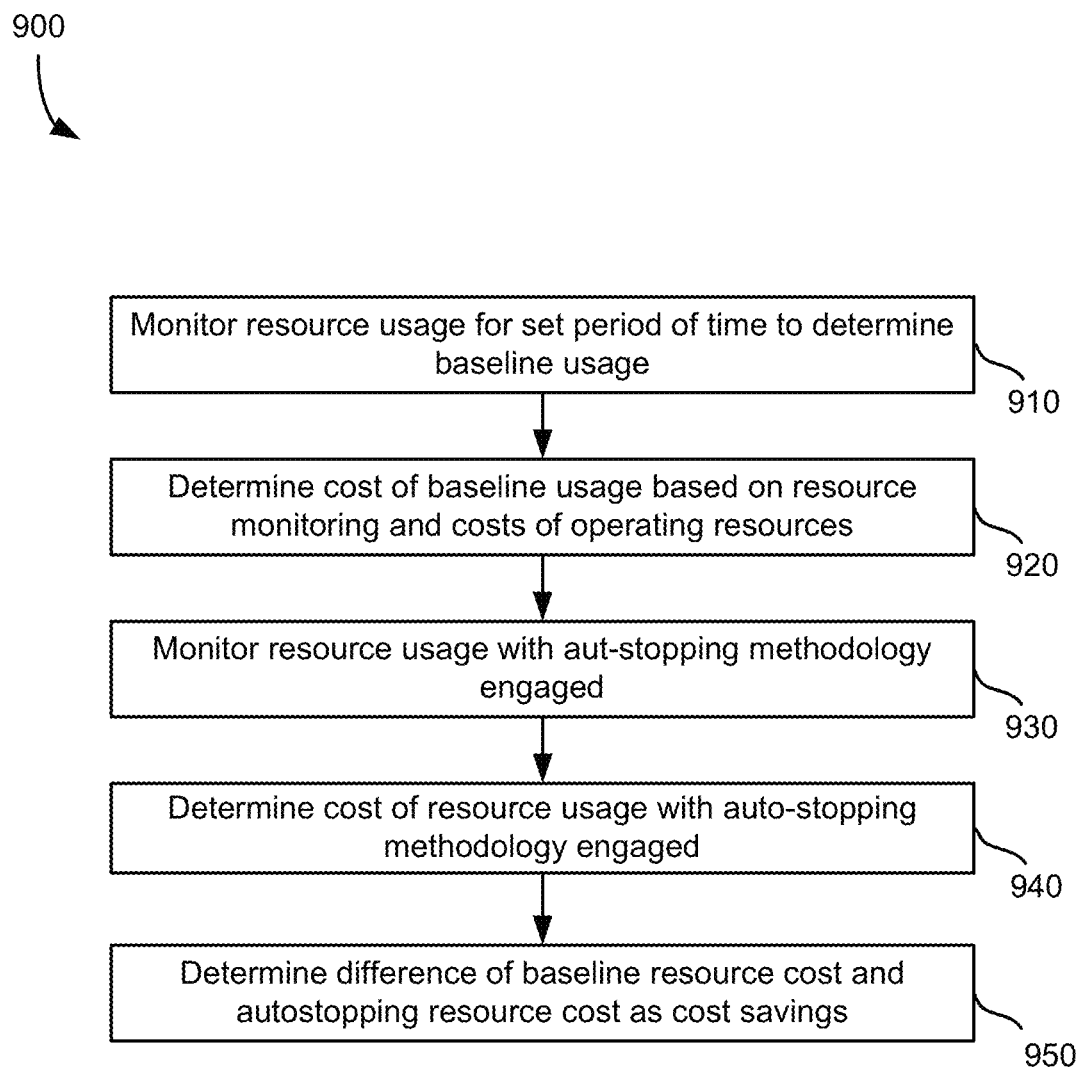
FIG. 9 is a method for determine the cost savings based on using resource auto-stopping.

FIG. 9 is a method for determine the cost savings based on using resource auto-stopping. Resource usage is monitored for a set period of time to determine the baseline usage of the resources of a resource environment at step 910. The monitoring may determine the usage time of the resources per day, per week, per month, and so forth. The cost of the baseline resource usage is determined based on the usage time and the cost per usage during the particular time at step 920. Hence, the cost of the baseline usage can be expressed as:

Baseline resource usage time×Resource usage cost=total baseline resource cost.

The resource usage with the auto-stopping feature engaged is monitored at step 930. The resource usage with the auto-stopping feature engaged will experience more time with resources shut-down, and thereby not incurring any cost. The cost of the resource usage with auto-stopping methodology engaged is determined at step 940. Similar to the total baseline resource cost, the total resource cost with auto-stopping feature engaged is the resource usage time with auto-stopping engaged multiplied by the resource usage cost.

The difference of the baseline resource cost and autostopping resource cost is determined as a cost savings at step 950. Hence, the total baseline resource cost minus the total resource cost with auto-stopping feature engaged is calculated to determine the cost savings by using the autostopping feature with the resources of the resource environment 120.

Figure 10:
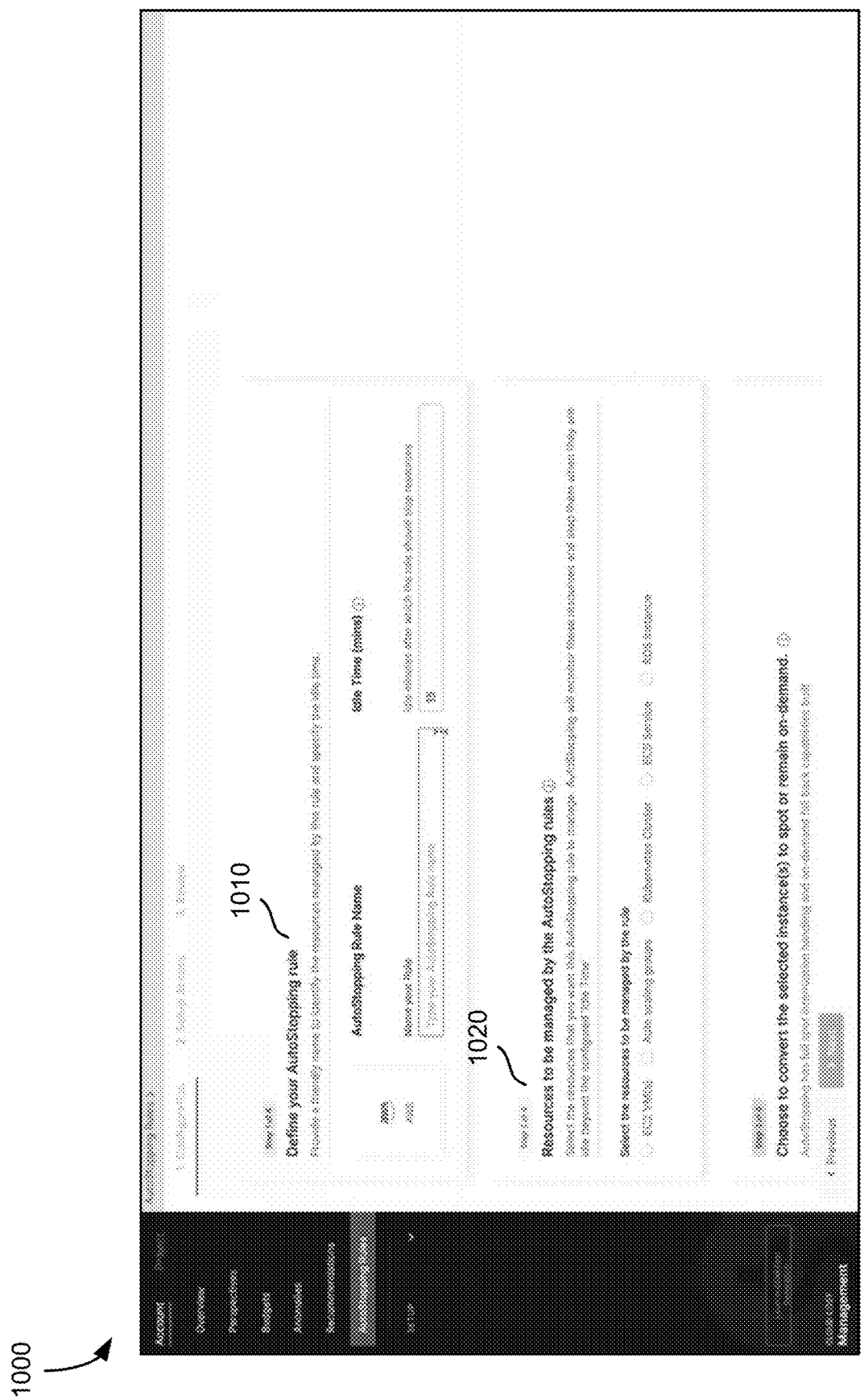
FIG. 10 is an interface for creating a rule set.

FIG. 10 is an interface for creating a rule set. The user interface 1000 of FIG. 10 allows a user to configure portions of a rule set for defining an autostopping rule and identifying resources to be managed by the autostopping rule. At user interface block 1010, a user may enter a name for the auto-stopping rule and set an idle time after which the identified one or more resources to which the rule is applied may be shut-down.

At user interface block 1020, a user may select which resources to be managed by the autostopping rule. The autostopping logic implemented herein, for example by an entity or module that implements the rule sets, will stop the selected resources when they are idle beyond the configured idle time.

Figure 11:
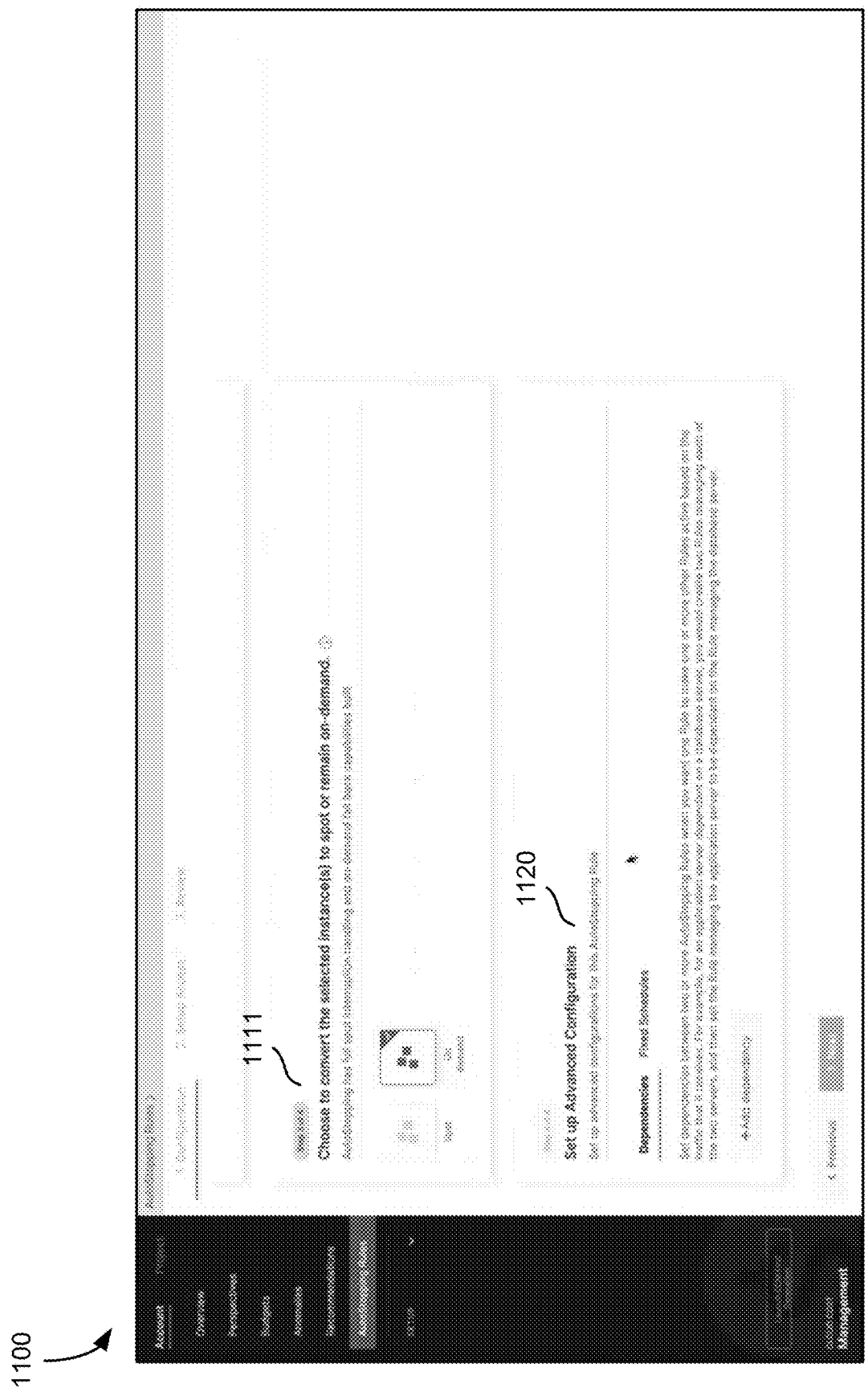
FIG. 11 is another interface for creating a rule set.

FIG. 11 is another interface for creating a rule set. The user interface 1100 allows a user to configure a shutdown state, set dependencies, and set fixed schedules. At user block 1111, a user can select to set a resource shutdown as either "spot" or "on demand." At user block 1120, a user can set dependencies between resources, for example indicating an order by which two resources should be shut down or powered up. The user may also select to configure fixed schedules for resources.

Figure 12:
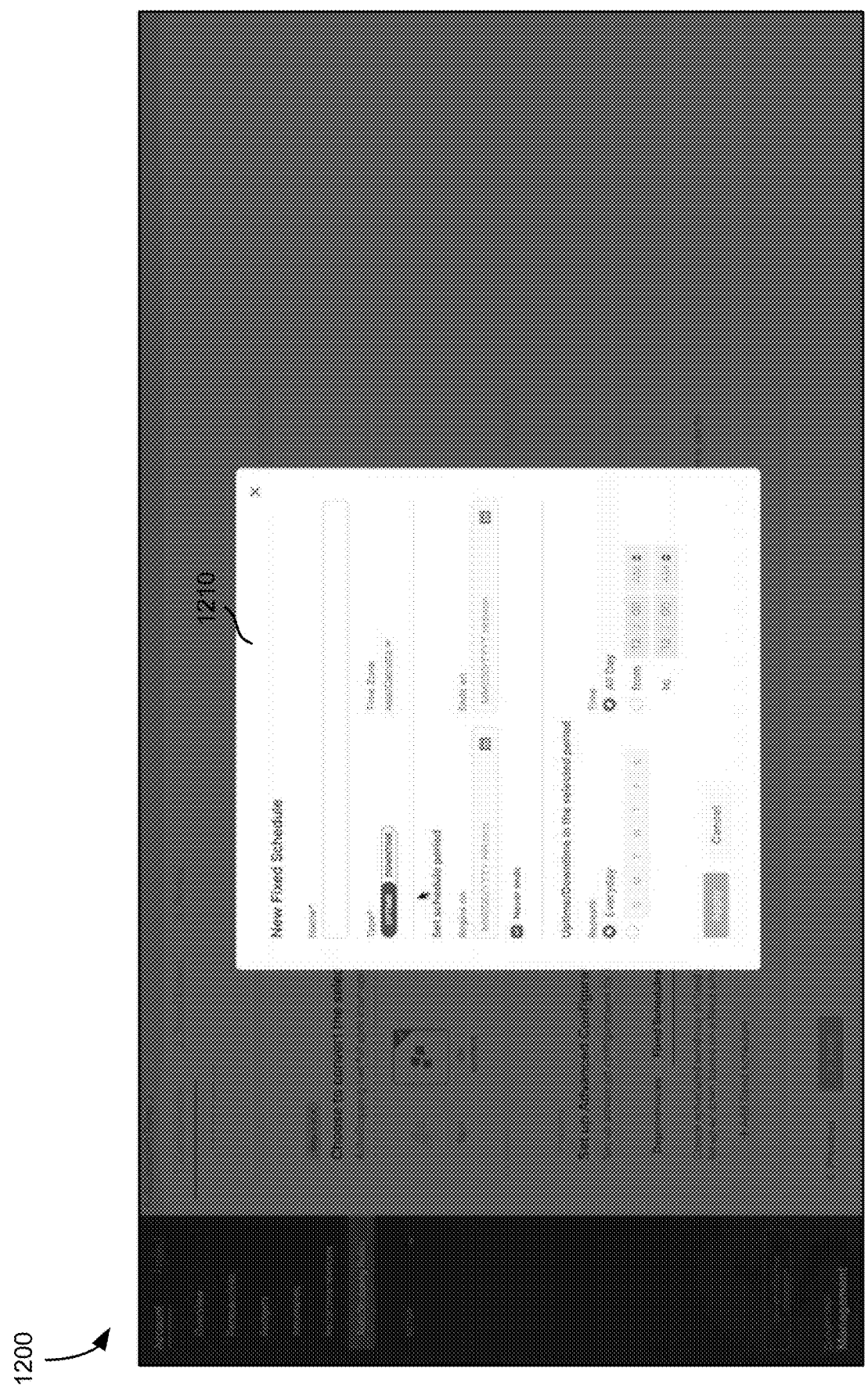
FIG. 12 is the mother interface for creating a rule set.

Upon selecting to configure fixed schedules at block 1120 of interface 1100, a popup window appears as illustrated in the interface of FIG. 12. FIG. 12 is a user interface for creating a rule set. User interface 1200 includes pop-up window 1210 for entering a fixed schedule for uptime or downtime for a particular resource. In particular, pop-up window 1210 allows a user to configure a name for the fixed schedule, whether the fixed time is resource uptime or downtime, a time zone, a scheduled period for configuring the uptime and downtime with a scheduled a begin time and down time in terms of month, day, year, hour and second, whether the uptime or downtime scheduled period should ever end, what days the uptime or downtime should repeat, and what times during the day the uptime or downtime should occur.

In some instances, rather than set an idle time for a set period of time by a user, the present system may use machine learning to learn the typical non-use times for the resource and its dependencies and automatically set the downtime or idle time based on the output of the machine learning model. In this instance, the rule set is generated at least in part based on a machine learning model. As the system receives additional user traffic and the actual resource idle time is determined, the machine learning model may be updated with the resource availability data, thereby becoming more accurate as time goes on.

Figure 13:
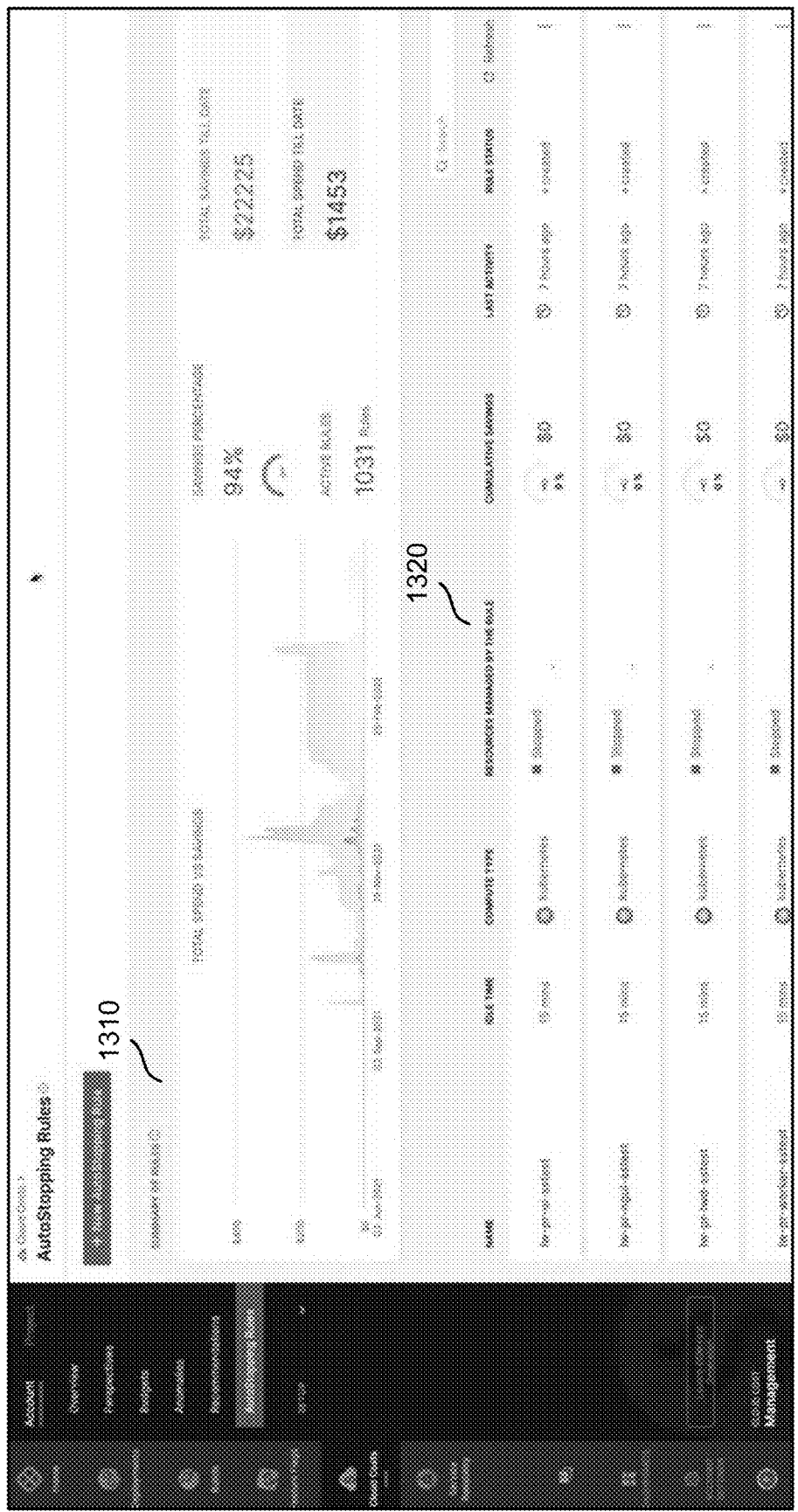
FIG. 13 is a dashboard for monitoring a set of rules for automatically stopping one or more resources.

FIG. 13 is a dashboard for monitoring a set of rules for automatically stopping one or more resources. User interface 1300 includes a dashboard that shows a summary 1310 of the rules and a list 1320 of the different rules and their related status and information. Summary 1310 includes the total spend vs the savings due to the autostopping feature, the savings percentage, the number of active rules, the total savings to date, and the total spend to date.

List 1320 lists, for each rule, the rule name, the idle time, the compute type (e.g., Kubernetes or other), the status of the resources managed by the rule (stopped or running), a cumulative savings based on the particular rule, the last activity for the resource, and the rule status.

In some instances, the pricing and cost data in summary 1310 can include the cost difference in performing autostopping of resources that results in a shutdown of a plurality of resources and not performing any shutdown of resources. In some instances, the pricing and cost data in summary 1310 can include the cost difference in potentially performing autostopping of resources that results in a shutdown of a plurality of resources and not performing any shutdown of resources. In this cost difference, a plan for potentially shutting down a plurality of resources using the autostopping feature is generated, but the resources are not actually shut down. Rather, the potential costs savings is computed so a user can see what the savings would actually be before committing to using the autostopping feature.

Figure 14:
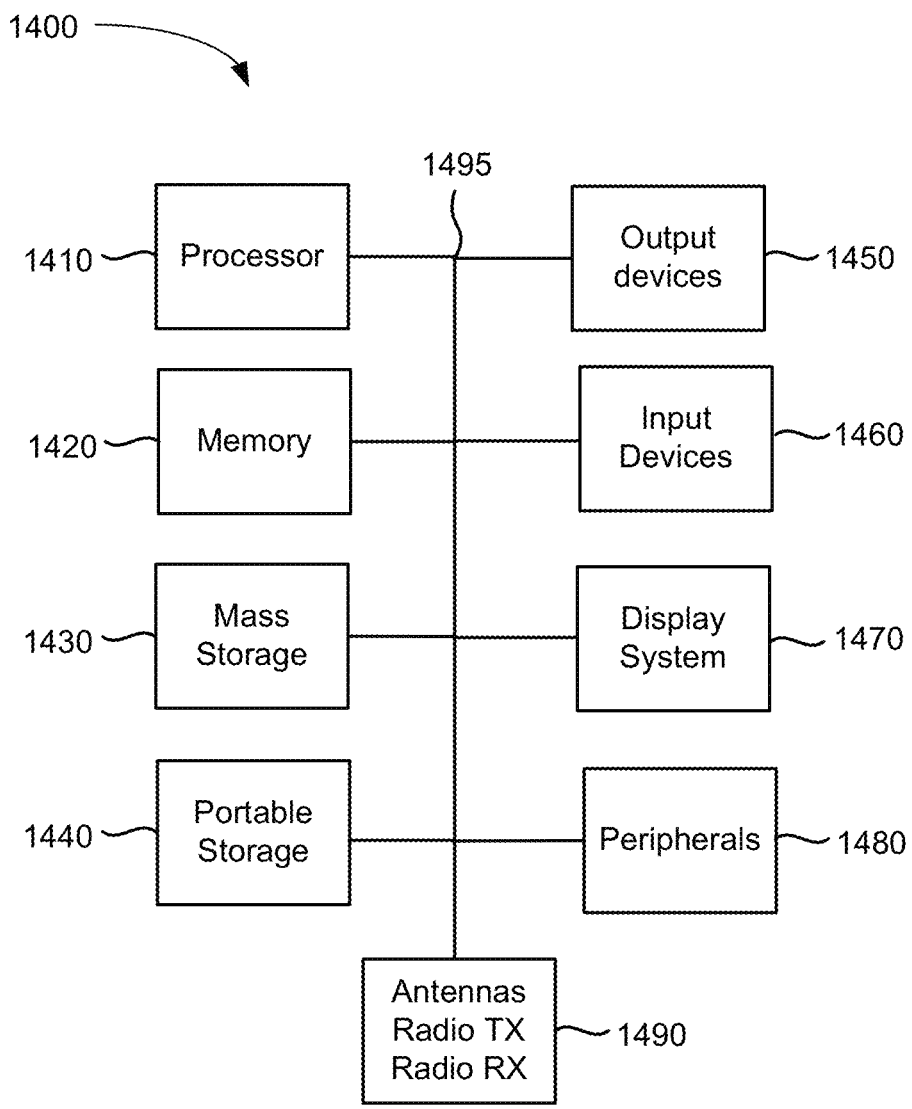
FIG. 14 is a computing environment for implementing the present technology.

FIG. 14 is a block diagram of a computing environment for implementing the present technology. System 1400 of FIG. 14 may be implemented in the contexts of the likes of machines that implement client machines 110, application server 170, and each entity in resource environment 120 (e.g., load balancer 130) and resource management system 140 of FIGS. 1-4. The computing system 1400 of FIG. 14 includes one or more processors 1410 and memory 1420. Main memory 1420 stores, in part, instructions and data for execution by processor 1410. Main memory 1420 can store the executable code when in operation. The system 1400 of FIG. 14 further includes a mass storage device 1430, portable storage medium drive(s) 1440, output devices 1450, user input devices 1460, a graphics display 1470, and peripheral devices 1480.

The components shown in FIG. 14 are depicted as being connected via a single bus 1490. However, the components may be connected through one or more data transport means. For example, processor unit 1410 and main memory 1420 may be connected via a local microprocessor bus, and the mass storage device 1430, peripheral device(s) 1480, portable storage device 1440, and display system 1470 may be connected via one or more input/output (I/O) buses.

Mass storage device 1430, which may be implemented with a magnetic disk drive, an optical disk drive, a flash drive, or other device, is a non-volatile storage device for storing data and instructions for use by processor unit 1410. Mass storage device 1430 can store the system software for implementing embodiments of the present invention for purposes of loading that software into main memory 1420.

Portable storage device 1440 operates in conjunction with a portable non-volatile storage medium, such as a floppy disk, compact disk or Digital video disc, USB drive, memory card or stick, or other portable or removable memory, to input and output data and code to and from the computer system 1400 of FIG. 14. The system software for implementing embodiments of the present invention may be stored on such a portable medium and input to the computer system 1400 via the portable storage device 1440.

Input devices 1460 provide a portion of a user interface. Input devices 1460 may include an alpha-numeric keypad, such as a keyboard, for inputting alpha-numeric and other information, a pointing device such as a mouse, a trackball, stylus, cursor direction keys, microphone, touch-screen, accelerometer, and other input devices. Additionally, the system 1400 as shown in FIG. 14 includes output devices 1450. Examples of suitable output devices include speakers, printers, network interfaces, and monitors.

Display system 1470 may include a liquid crystal display (LCD) or other suitable display device. Display system 1470 receives textual and graphical information and processes the information for output to the display device. Display system 1470 may also receive input as a touch-screen.

Peripherals 1480 may include any type of computer support device to add additional functionality to the computer system. For example, peripheral device(s) 1480 may include a modem or a router, printer, and other device.

The system of 1400 may also include, in some implementations, antennas, radio transmitters and radio receivers 1490. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 1400 of FIG. 14 are those typically found in computer systems that may be suitable for use with embodiments of the present invention and are intended to represent a broad category of such computer components that are well known in the art. Thus, the computer system 1400 of FIG. 14 can be a personal computer, handheld computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for automatically stopping resources, comprising:
    detecting, by a traffic detection module, that a first resource is idle for a set period of time, wherein during the idle time the first resource has not received any traffic consisting of a remote machine request or processed any request received form a remote machine;
    instructing an application to redirect subsequent traffic intended for the first resource to a proxy machine, the redirection implemented based at least on a rule set and the detection that the first resource was idle for the set period of time;
    performing a shutdown of the first resource based on the rule set;
    receiving subsequent traffic by the proxy machine that was intended for the first resource;
    performing start-up of the first resource based on the rule set; and
    directing traffic to the first resource by the proxy machine in response when first resource start-up is complete.

2. The method of claim 1, wherein the idle time is configured by a user.

3. The method of claim 1, wherein shutdown of the first resource includes shutting down the first resource that has been idle for the set period of time and shutting down a second resource that has a dependency with the first resource.

4. The method of claim 3, wherein the first rule set specifies an order to shutdown the first resource and the second resource.

5. The method of claim 1, wherein starting up the first resource includes starting up the first resource and starting up a second resource based on a dependency of the second resource with the first resource, the dependency and the order of startup of the first resource and the second resource specified within the rule set.

6. The method of claim 1, further comprising:
providing the user with a user interface for configuring a rule set for performing autostopping of one or more resources, the one or more resources including the first resource;
receiving input from the user regarding an idle time, resource dependency, and autostopping scheduling data; and
storing the rule set in a local computing environment.

7. The method of claim 1, further comprising determining a cost savings from performing shutdown of a plurality of resources, the plurality of resources including the first resource, compared to not performing shutdown of any of the plurality resources.

8. The method of claim 1, further comprising determining a cost savings from a possible but not implemented shutdown of a plurality of resources, the plurality of resources including the first resource, compared to not performing shutdown of any of the plurality resources.

9. A non-transitory computer readable storage medium having embodied thereon a program, the program being executable by a processor to perform a method for automatically stopping resources, the method comprising:
detecting, by a traffic detection module, that a first resource is idle for a set period of time, wherein during the idle time the first resource has not received any traffic consisting of a remote machine request or processed any request received form a remote machine;
instructing an application to redirect subsequent traffic intended for the first resource to a proxy machine, the redirection implemented based at least on a rule set and the detection that the first resource was idle for the set period of time;
performing a shutdown of the first resource based on the rule set;
receiving subsequent traffic by the proxy machine that was intended for the first resource;
performing start-up of the first resource based on the rule set; and
directing traffic to the first resource by the proxy machine in response when first resource start-up is complete.

10. The non-transitory computer readable storage medium of claim 9, wherein the idle time is configured by a user.

11. The non-transitory computer readable storage medium of claim 9, wherein shutdown of the first resource includes shutting down the first resource that has been idle for the set period of time and shutting down a second resource that has a dependency with the first resource.

12. The non-transitory computer readable storage medium of claim 11, wherein the first rule set specifies an order to shut down the first resource and the second resource.

13. The non-transitory computer readable storage medium of claim 9, wherein starting up the first resource includes starting up the first resource and starting up a second resource based on a dependency of the second resource with the first resource, the dependency and the order of startup of the first resource and the second resource specified within the rule set.

14. The non-transitory computer readable storage medium of claim 9, further comprising:
providing the user with a user interface for configuring a rule set for performing autostopping of one or more resources, the one or more resources including the first resource;
receiving input from the user regarding an idle time, resource dependency, and autostopping scheduling data; and
storing the rule set in a local computing environment.

15. The non-transitory computer readable storage medium of claim 9, further comprising determining a cost savings from performing shutdown of a plurality of resources, the plurality of resources including the first resource, compared to not performing shutdown of any of the plurality resources.

16. The non-transitory computer readable storage medium of claim 9, further comprising determining a cost savings from a possible but not implemented shutdown of a plurality of resources, the plurality of resources including the first resource, compared to not performing shutdown of any of the plurality resources.

17. A system for automatically stopping a resource, comprising:
a server including a memory and a processor; and
one or more modules stored in the memory and executed by the processor to detect, by a traffic detection module, that a first resource is idle for a set period of time, wherein during the idle time the first resource has not received any traffic consisting of a remote machine request or processed any request received form a remote machine, instruct an application to redirect subsequent traffic intended for the first resource to a proxy machine, the redirection implemented based at least on a rule set and the detection that the first resource was idle for the set period of time, perform a shutdown of the first resource based on the rule set, receive subsequent traffic by the proxy machine that was intended for the first resource, perform start-up of the first resource based on the rule set, and direct traffic to the first resource by the proxy machine in response when first resource start-up is complete.

18. The system of claim 17, wherein the idle time is configured by a user.

19. The system of claim 17, wherein shutdown of the first resource includes shutting down the first resource that has been idle for the set period of time and shutting down a second resource that has a dependency with the first resource.

20. The method of claim 19, wherein the first rule set specifies an order to shut down the first resource and the second resource.

* * * * *